United States Patent [19]

Kern et al.

[11] Patent Number: 5,051,595
[45] Date of Patent: Sep. 24, 1991

[54] FIBER OPTIC FLAME DETECTION AND TEMPERATURE MEASUREMENT SYSTEM EMPLOYING DOPED OPTICAL FIBER

[75] Inventors: Mark T. Kern, Goleta; Kenneth A. Shamordola, Santa Barbara; Gregory L. Tangonan, Oxnard; John M. Wetzork, Goleta, all of Calif.

[73] Assignee: Santa Barbara Research Center, Goleta, Calif.

[21] Appl. No.: 446,953

[22] Filed: Dec. 6, 1989

[51] Int. Cl.⁵ .................. G01K 11/20; G01J 1/58
[52] U.S. Cl. .................. 250/458.1; 250/339; 250/227.14; 250/554; 374/161; 340/578
[58] Field of Search .......... 250/339, 337, 227.11, 250/227.14, 227.16, 227.23, 458.1, 340; 356/44; 340/577, 578, 584; 374/121, 131, 159, 161

[56] References Cited

U.S. PATENT DOCUMENTS

| | | | |
|---|---|---|---|
| 2,901,740 | 8/1959 | Cutsogeorge | 340/233 |
| 3,406,389 | 10/1968 | Nailen | 340/411 |
| 3,540,041 | 11/1970 | Payne | 340/227 |
| 3,546,689 | 12/1970 | Lindberg | 340/227 |
| 3,730,259 | 5/1973 | Wixson et al. | 165/5 |
| 3,880,324 | 4/1975 | Showalter et al. | 166/251 |
| 3,977,900 | 8/1976 | Luehrs | 136/83 |
| 4,138,655 | 2/1979 | Nakano et al. | 338/30 |
| 4,313,344 | 2/1982 | Brogardth et al. | 356/44 |
| 4,376,890 | 3/1983 | Engström et al. | 356/44 |
| 4,400,680 | 8/1983 | Heline, Jr. | 337/415 |
| 4,496,930 | 1/1985 | Krecisz et al. | 338/26 |
| 4,616,137 | 10/1986 | Goff et al. | 250/554 |
| 4,623,788 | 11/1986 | Kern et al. | 250/227 |
| 4,639,598 | 1/1987 | Kern et al. | 250/339 |
| 4,647,776 | 3/1987 | Kern et al. | 250/339 |
| 4,650,003 | 3/1987 | Euson | 169/60 |
| 4,655,390 | 5/1987 | Kern et al. | 340/587 |
| 4,655,607 | 4/1987 | Kern et al. | 374/4 |
| 4,679,156 | 7/1987 | Kern et al. | 364/551 |
| 4,691,196 | 9/1987 | Kern et al. | 340/578 |
| 4,701,624 | 10/1987 | Kern et al. | 250/554 |
| 4,769,775 | 9/1988 | Kern et al. | 364/551.01 |
| 4,785,292 | 11/1988 | Kern et al. | 340/578 |
| 4,900,933 | 2/1990 | Nestor et al. | 250/458.1 |
| 4,904,864 | 2/1990 | Dakin et al. | 250/226 |

OTHER PUBLICATIONS

Glenn, W. H. *Optical Fiber Sensors, Proceedings of the NATO Advanced Study Institute* pp. 185–199 "Fiber Optic Temperature Sensors" May, 1986.
"Fluorescent Decay Thermometer with Biological Applications" by R. R. Sholes et al. Rev. Sci, Instrum.; vol. 41, No. 7, 9/80.
(List continued on next page.)

*Primary Examiner*—Carolyn E. Fields
*Assistant Examiner*—James E. Beyer
*Attorney, Agent, or Firm*—W. C. Schubert; W. K. Denson-Low

[57] ABSTRACT

A fiber optic fire detection and temperature measurement system 10 includes a fiber optic cable 12 having a lens 14 at a distal to direct radiation from a fire 16 into the cable 12 and to radiation detector 18 disposed at a proximal end of the cable 12. Detector 18 is coupled to a fire sensor 20. Detector 18 is sensitive to three wavelength bands including a short wavelength band of approximately 0.8 to 1.1 microns, a mid-wavelength band of approximately 1.3 to 1.5 microns and a long-wavelength band of approximately 1.8 to 2.1 microns. A controller 22, analyzes the fire sensor 20 output signals which correspond to the two spectral bands to determine if a fire is present. The fiber optic conductor is doped with a material selected for its temperature dependent fluorescent emission characteristics. Radiation from a fire passes via cable 12 to the detector 18. A pulse of radiation from source 28 passes from a coupler 26 and 26a to the cable 12. The fluorescent doping material within the fiber optic cable 12 is pumped by the pulse and is caused to fluoresce within the third wavelength band. A portion of the fluorescent emission passes back through the fiber 12 to the detector 18 where the fluorescent emission is detected and processed to determine the temperature.

17 Claims, 3 Drawing Sheets

OTHER PUBLICATIONS

"Infrared Fluorescent Decay-Time Temperature Sensor" by K.T.V. Frattan et al.

"A Laser-Pumped Temperature Sensor Using the Fluorescent Decay Time of Alexandrite" by A. T. Augousti et al.; Jrnl. of Lightwave Technology; vol. LT-5, No. 6, Jun. 1987.

"Temperature Sensing by Thermally-Induced Absorption in a Neodymium Doped Optical Fiber" by M. Farries et al.; SPIE vol. 798, Fiber Optic Sensors II (1987).

"Fiber Optic Temperature Sensors" by W. H. Glenn, United Technologies Research Center.

"Fiber Sensor Devices and Applications"; by A. D. Kersey published for the conference on Optical Fiber Communication; 1989.

TIME FOR PULSE TO DECAY 63%

FIBER OPTIC FLAME DETECTION AND TEMPERATURE MEASUREMENT SYSTEM EMPLOYING DOPED OPTICAL FIBER

CROSS REFERENCE TO RELATED PATENT APPLICATION

This patent application is related to U.S. patent application Ser. No. 07/322,866, filed Mar. 14, 1989, entitled "Fiber Optic Flame and Overheat Sensing System With Self Test" by Mark T. Kern et al.

FIELD OF THE INVENTION

This invention relates generally to fire detection systems and, in particular, to a fiber optic fire detection system that employs a doped optical fiber as a temperature sensing element.

BACKGROUND OF THE INVENTION

One conventional fire and overheat sensor is known as a "thermal wire". This system senses a fire or overheat condition by thermal conduction from ambient to the center of a 1/16 inch diameter stainless steel tube. The sensing element may be a hydride which generates a gas as the temperature increases, the generated gas being sensed by a pressure switch. Alternatively the sensing element may be a salt or a glass or a thermistor element which melts and/or changes resistance as temperature increases thus causing a change in an electrical resistivity vs. temperature characteristic of the sensing element.

Another conventional fire and overheat sensor employs a far-infrared optical detector to detect radiometric heat in combination with a two spectrum, far-near infrared fire detector.

However, for many high ambient temperature applications, such as jet aircraft engine nacelles, this latter type of system may not be useable in that the system typically has a maximum ambient temperature limitation of approximately 400° F. This maximum ambient temperature limitation is due in large part to the maximum temperature limits of the sensor electronics.

The thermal wire type of system, which typically has a higher ambient temperature limitation, is suitable for use in an engine nacelle. However, this type of system has a relatively slow response time. As reported by Delancy in "Fire Detection System Performance in USAF Aircraft" Technical Report AFAPL-TR-72-49, August 1972 this type of system furthermore may not detect as many as 40% of confirmed fires while exhibiting up to a 60% false alarm rate.

In U.S. Pat. Nos. 4,701,624, 4,691,196, 4,665,390 and 4,639,598, all of which are assigned to the assignee of this invention, there are described fire sensor systems which have overcome the problems inherent in the aforementioned thermal wire type of system. These systems accurately and rapidly detect the occurrence of a fire while also eliminating false alarms. An enhancement of these techniques has been disclosed in U.S. patent application Ser. No.: 07/322,866 using an optical fiber transmission medium employing wavelengths of less than 2.5 microns. However, in that these systems employ wavelengths of less than 2.5 microns it is difficult for them to be simultaneously employed for detecting overheat conditions in the 200° C. range in a radiometric fashion as described in U.S. Pat. No. 4,647,776 which is also assigned to the assignee of this patent application.

It is thus an object of the invention to provide both a flame and heat sensing system that employs wavelengths of less than 2.5 microns for flame detection while simultaneously detecting an overheat condition.

It is a further object of the invention to provide a flame and heat sensing system that employs wavelengths of less than 2.5 microns for flame detection while simultaneously detecting an overheat condition such that an actual flame condition is not required to generate an alarm condition.

It is one further object of the invention to provide a flame detection and a temperature measurement system for use in an environment having a high ambient temperature, such as an aircraft engine nacelle, and which further eliminates the undetected fire and false alarm deficiencies of conventional systems, such as thermal wire systems.

It is a further object of the invention to provide a fiber optic flame detection system with a temperature measurement capability by employing a temperature dependent fluorescent emission characteristic of a material that dopes the fiber optic, the material being pulsed with optical radiation at a first wavelength and a fluorescent response of the material being determined at a second wavelength.

It is a further object of the invention to provide a fiber optic flame detection system with a temperature measurement capability by employing a temperature dependent radiation absorption characteristic of a material that uniformly dopes the fiber optic along its length.

It is also an object of the invention to provide signal processing circuitry such that a fire sensing function and an overheat sensing function do not interfere with one another even though these two functions may share the same fiber, detectors and circuitry.

SUMMARY OF THE INVENTION

The foregoing problems are overcome and other advantages are realized by a fiber optic fire and overheat sensor system that includes a fiber optic cable having a lens at a distal end to direct radiation from a fire into the cable and to a radiation detector disposed at a proximal end of the cable. The detector is coupled to a fire sensor. The detector is sensitive to three wavelength bands including, by example, a short wavelength band of approximately 0.8 to approximately 1.1 microns, a mid-wavelength band of approximately 1.3 to approximately 1.5 microns and a long-wavelength band of approximately 1.8 microns to approximately 2.1 microns. A controller, such as a microprocessor, analyzes the fire sensor output signals which correspond to the two spectral bands to determine if a fire is present. In accordance with one embodiment of the invention the fiber optic conductor is doped with a material selected for a fluorescent emission characteristic having wavelengths within the long-wavelength band. A fiber optic coupler launches the output of a radiation source, such as a laser diode, into the fiber optic cable. This source of radiation is periodically modulated and may be, by example, pulsed or sinusoidal. The fiber optic cable both transmits the source radiation to the distal end and also returns the fluorescence and fire signal from the distal end to the detector. The fluorescent material is pumped by the source at a first wavelength and the rate of decay or the phase shift of a resulting fluorescent emission is measured and correlated with predetermined decay rates or phase shifts to derive the temperature of the material and, hence, the ambient temperature of a region within which the material is disposed.

In another embodiment of the invention the fiber optic conductor is doped with a material selected for a temperature dependent radiation absorption characteristic. An amount of injected radiation absorbed within the fiber is correlated with the temperature of the fiber.

BRIEF DESCRIPTION OF THE DRAWING

The above set forth and other features of the invention will be made more apparent in the ensuing Detailed Description of the Invention when read in conjunction with the attached Drawing, wherein.

DETAILED DESCRIPTION OF THE INVENTION

Figure 1:
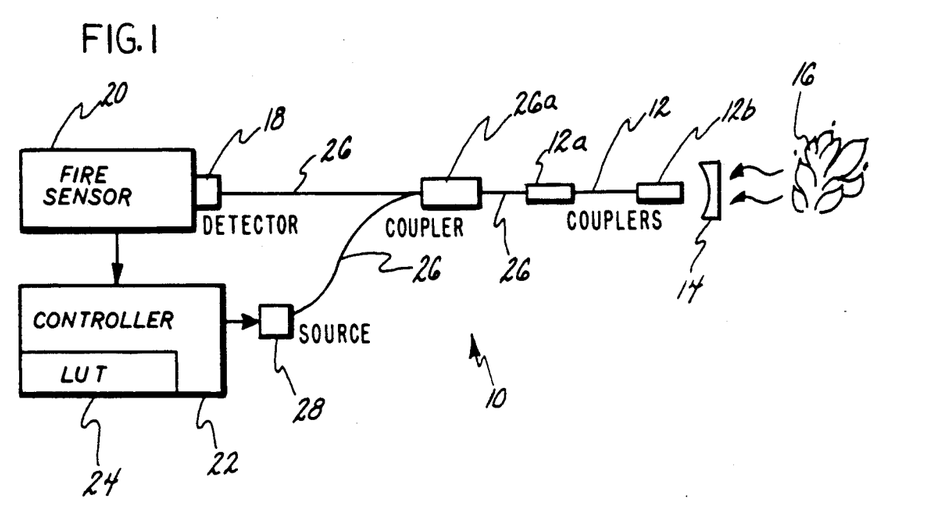
FIG. 1 is a block diagram which illustrates the various optical and electrical components which comprise a fire detection and temperature measurement sensor which is one embodiment of the invention.

Referring to FIG. 1 there is shown a fiber optic fire and overheat sensor system 10. System 10 includes a fiber optic cable 12 having a lens 14 at a distal end to direct radiation from a fire 16 into the cable 12 through an optical coupler 12b. The radiation is conveyed to a radiation detector 18 disposed at a proximal end of the cable 12 through an optical fiber 26 and coupler 26a. Coupler 26a is of minimal length and serves to introduce a controlled source 28 of radiation into the fiber 12. Detector 18 is coupled to a fire sensor 20. The detector 18 is typically comprised of silicon disposed on germanium which is disposed on lead sulfide and is thus preferably sensitive to three wavelength bands. In a presently preferred embodiment of the invention the three bands include a short-wavelength band of approximately 0.8 to approximately 1.1 microns, a mid-wavelength band of approximately 1.3 to approximately 1.5 microns and a long-wavelength band of approximately 1.8 to 2.1 microns. The two lower bands (0.8-1.1 microns and 1.3-1.5 microns) are used for fire sensing while the longest wavelength band is used for overheat sensing. A controller 22, such as a microprocessor, analyzes the fire sensor 20 output signals which correspond to the two shorter wavelength spectral bands to determine if a fire is present. As can be appreciated the use of a small diameter fiber optic cable with a correspondingly dimensioned pickup 14 lens enables the system 10 to detect fires in small and relatively inaccessible locations.

In addition, the fire sensor 20 together with the controller 22 is small and compact (palm of hand size) and a single fire sensor/controller module 20, 22 can be used with a multiplicity of fiber optic cables 12 and fiber optic couplers 26. One convenient packing function includes seven fiber optic cables 12 interfacing with a single fire sensor/controller 20,22.

Figure 1A:
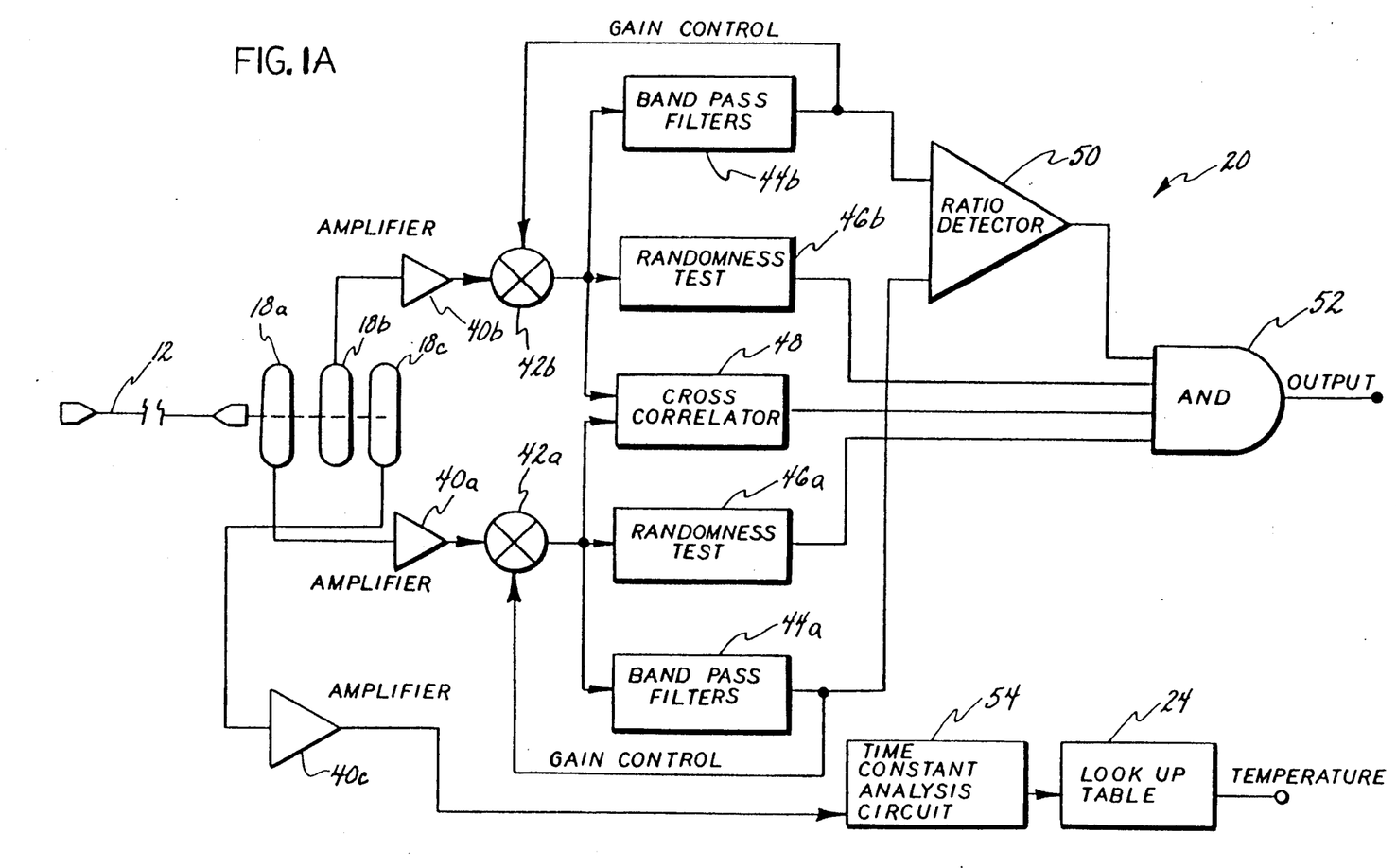
FIG. 1a is a block diagram which shows in greater detail the sensor of FIG. 1.

Referring to FIG. 1a there is shown in greater detail the sensor 20 of FIG. 1. The high sensitivity fiber optic fire sensor 20 employs spectral discrimination, flicker frequency discrimination, automatic gain control (AGC), ratio detection, cross correlation and randomness tests to achieve a wide dynamic range of detectable input stimuli without compromising false alarm immunity. It should be realized that the various blocks shown in FIG. 1a may be constructed from discrete circuitry or the functionality of the various blocks may be realized by instructions executed by a microcontroller device such as a digital signal processor (DSP).

Radiation is detected in the two aforementioned infrared spectral bands; namely the middle wavelength and the short wavelength spectral bands. The specific bands, approximately 0.8 to approximately 1.1 microns and approximately 1.3 to approximately 1.5 microns, are selected to enhance false alarm immunity. The radiation is collected at the distal end of the fiber optic cable 12 and is conducted thereby to the concentric, multilayer detector 18 which comprises the two shorter wavelength infrared-sensitive elements (18a, 18b) contained within a unitary sealed package. Each of the detectors 18a and 18b has an output coupled to a corresponding low noise amplifier 40a and 40b. The output of each of the amplifiers 40a and 40b are applied to an associated variable gain block 42a and 42b where, in conjunction with a corresponding bandpass filters 44a and 44b, an AGC function is accomplished. Filters 44a and 44b are comprised of a multiplicity of bandpass filters such as 1 Hz, 2 Hz and 4 Hz where an output of each bandpass filter is required in order to guarantee that the detected fire has a broad spectral frequency distribution and is not dominated by a single frequency such as a modulated artificial source. The output of each of the variable gain elements 42a and 42b are input to a corresponding randomness test block 46a and 46b and to a cross-correlator 48. A ratio detector 50 accomplishes a ratiometric comparison of the outputs of bandpass filters 44a and 44b. An AND logic function generator 52 receives as inputs the outputs of the ratio detector 50, randomness test blocks 46a and 46b and the cross-correlator 48. A generator 52 output signal is asserted true, indicating the occurrence of a fire, when each of the inputs are true.

It has been determined that most false alarm sources have a spectral frequency distribution significantly different from that of flames when observed in two separated wavelength regions. The modulation component of the signals from the two wavelength regions is filtered by filters 44a and 44b into selected frequencies within the flicker frequency spectrum. This filtering provides additional discrimination against false alarms, most of which have intensity fluctuation spectra different from those of the flames of interest. To preserve this discrimination while allowing a wide range of intensity levels, the flicker modulation spectral information is detected by a ratiometric method (detector 50) which is independent of the absolute value of the spectral information. Additional variation in signal levels is made possible by the variable gain stages 42a and 42b which precede signal processing.

The flame flicker statistics, such as amplitude and spectral distributions, can be shown to be highly variable in that the spectrum as observed over any time interval of several seconds may be quite different from the spectrum taken over a subsequent time interval. However, and as is shown in U.S. Pat. No. 4,665,390, assigned to the assignee of the patent application, when the fire is modeled as a random process and a randomness test such as Chi Square or Kurtosis is applied, flame flicker is easily separated from non-flame modulated sources. In some cases a relatively simple amplitude modulation test is sufficient to approximate these randomness tests.

A further processing step is used in comparing the shapes of the unfiltered long and short wavelength signals with the cross-correlation block 48. To eliminate false alarms due to chopped, periodic, signals the randomness test blocks 46a and 46b are also employed within each of the short and long wavelength signal channels.

Further in accordance with the invention the fiber optic conductor of cable 12 is doped with a material selected for its fluorescent emission characteristics. As used herein, fluorescence is considered to be an emission from a material, such as a doped crystalline material, of a first wavelength of radiation when excited or pumped by a light source having a second wavelength of radiation. Many types of crystals exhibit fluorescence including ruby (chromium doped sapphire) and neodymium doped glass. One useful property of fluorescence is that the rate at which the emission decays is often a function of the temperature of the material. In accordance with one aspect of the invention the fluorescent material that dopes the optical fiber is pumped by the source 28 at a second wavelength to generate fluorescence at a first wavelength. The rate of decay of the resulting fluorescent emission is measured and correlated with predetermined decay rates to derive an integrated effect of the temperature along the length of the cable 12 and, hence, the ambient temperature of a region within which the cable 12 is disposed.

Figure 2A:
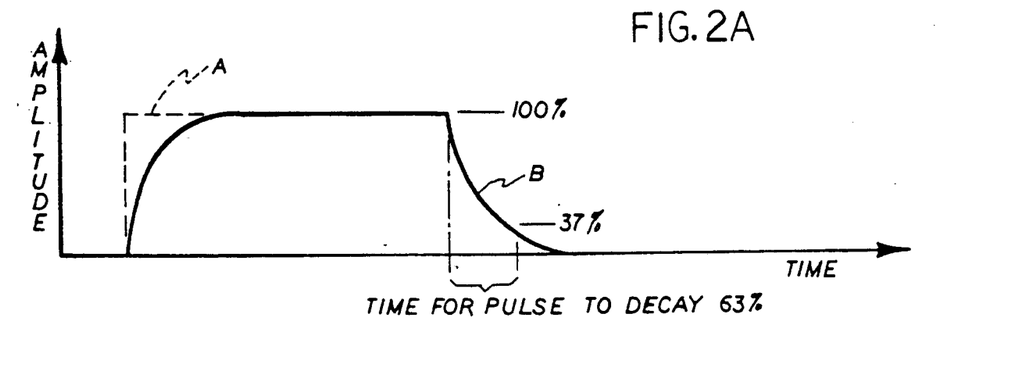
FIG. 2a is a graph which illustrates a pulse response of a fluorescent crystal, including the temperature-dependent time for fluorescent decay from 100% to 37%.
Figure 3:
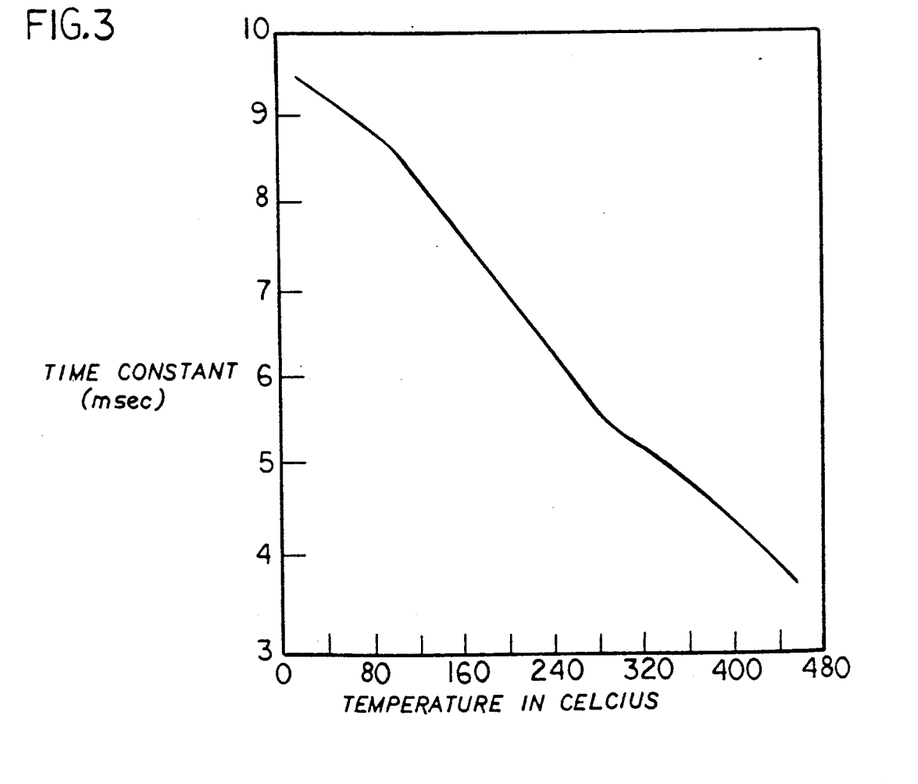
FIG. 3 is a graph that illustrates the fluorescent time constant as a function of temperature of one type of fluorescent material which is suitable for use with the system of the invention.

As an example, and referring to FIG. 2a, the source 28 is pulsed (dotted pulse A) at the first wavelength to excite the fluorescent material at the second wavelength as shown by the output pulse (solid pulse B) having a slower rise and fall time. The time required for the fluorescence to decay is a function of temperature and, typically, this time constant decreases in duration as temperature increases. The time constant (t) required for the emission to decay to 37% of its initial value can be plotted, in a manner shown in FIG. 3, as a function of temperature. FIG. 3 shows a plot of the fluorescent decay time constant vs. temperature for a thulium and holmium doped yttrium-aluminum garnet (Tm:Ho:YAG) crystal.

Figure 2B:
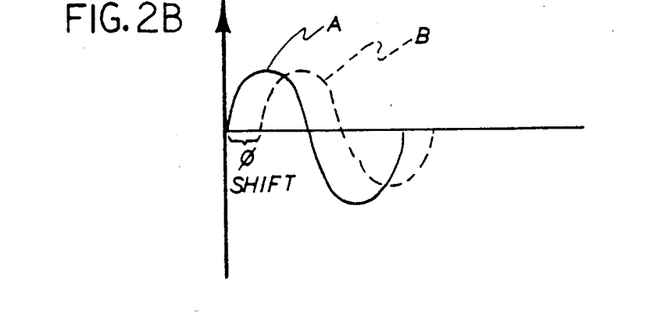
FIG. 2b is a graph that illustrates a sinusoidal response of a fluorescent crystal.

FIG. 2b shows an embodiment wherein the source 28 is energized to produce a sinusoidal excitation (A) of the fluorescent material. The fluorescent emission (B) is also sinusoidal but is phase shifted by an amount which is a function of temperature.

Referring once more to FIG. 1 the foregoing teaching is incorporated within the system 10 by the use of the fiber optic coupler 26 and 26a which launches radiation from the source 28, such as a laser diode, into the fiber optic cable 12. The fiber optic cable 12 thus both transmits the source radiation to the distal end and also returns the fluorescence and fire signal from the distal end to the detector 18. In a preferred embodiment of the invention the source 28 emits radiation within the lower spectral band, such as 0.8 microns, so that the source pulse can be detected by detector 18 to provide a reference signal. However, in other embodiments of the invention the laser diode does not emit within the lower spectral band. By example, the source 28 emission may be at 0.6 microns such that no source 28 generated radiation returns to or is detected by the detector in the 0.8 to 1.1 micron band.

In operation radiation from a fire enters the lens 14 and passes via couplers 12a, 12b and 26a and fiber optic conductors 12 and 26 to the detector 18. A pulse of radiation from the 0.8 micron source 28 passes from the coupler 26a to the fiber cable 12. The fluorescent doping material within the fiber optic cable 12 is pumped by the pulse and is caused to fluoresce. A portion of the fluorescent emission passes back through the fiber 12 to the detector 18 where the fluorescent emission is detected by the long wavelength sensitive detector 18 portion (detector 18c) and is processed to determine the duration of the temperature dependent rate of decay. The duration is subsequently correlated with the temperature of the cable 12. The output of detector 18c is applied to an associated amplifier 40c that has an output connected to a time constant analysis circuit 54. Circuit 54 converts the analog output of amplifier 40c to a digital signal suitable for application to LUT 24 for determining the temperature as a function of the fluorescent pulse decay time.

As can be appreciated the fluorescent doping material should possess certain physical properties in order to confer the greatest benefit. Firstly, the material preferably fluoresces within the upper wavelength range, such as within the range of approximately 1.8 to 2.1 microns. Secondly, in order to accurately measure the fluorescence wavelength it is preferable to separate out the pump wavelength. In addition, it is preferable to separate out the pump wavelength without adding additional detectors and/or filters. This is accomplished by providing a fluorescent doping material that fluoresces within the upper wavelength region, or approximately 1.8 to approximately 2.1 microns, for a pump wavelength within the lower fire sensor wavelength band of approximately 0.8 to approximately 1.1 microns. The fluorescence is thus separated out since the silicon and germanium detectors, being physically disposed on top of the long wavelength detection 18c, are opaque at the pump wavelength but transparent at the fluorescence wavelength. In addition, it is necessary to have the fluorescence at a different wavelength than the two fire sensing wavelengths since the fiber's fluorescence will otherwise interfere with fire sensing.

Thirdly, the pump wavelength band to which the fluorescent doping material is responsive is preferably relatively broad in that the source 28 may drift in wavelength with temperature. Furthermore, the fluorescent doping material preferably has a decay time constant duration that presents a readily measurable quantity at a highest measurement temperature of interest. To enhance the return of a maximum amount of fluorescence radiation to the detector 18, a dichroic coating at the far fiber end coupler 12a can be used. This dichroic coating transmits below 1.8 microns and reflects above 1.8 microns. Thus all wavelengths associated with fire sensing are transmitted through the dichroic coating to the detector 18 while all wavelengths associated with fluorescence are reflected off the dichroic coating and back to the detector 18.

Figure 4:
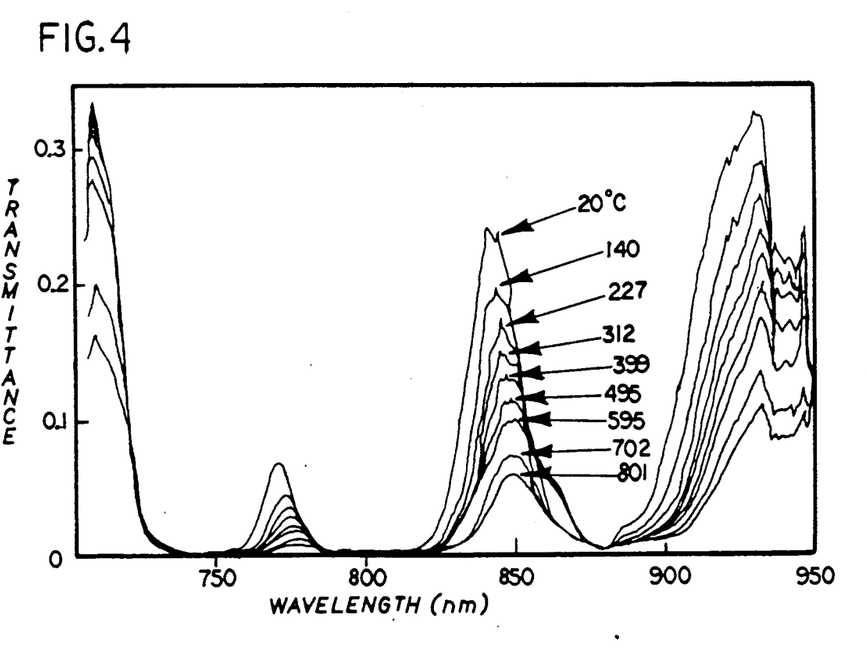
FIG. 4 is a graph that illustrates the transmittance versus temperature and wavelength of Nd doped glass fiber.

A still further consideration is that the fluorescent doping material does not absorb a significant portion of the radiation within either of the two fire sensor bands. By example, FIG. 4 illustrates the transmittance characteristic as a function of wavelength and temperature of Nd-doped glass fiber. As can be seen, this particular type of fiber is strongly absorbtive at approximately 0.83 and 0.88 microns. As a result this particular type of doping material would be less than optimum for use with a system employing 0.8 to 1.1 microns as a fire sensor band.

Examples of fiber doping materials that meet the above set forth criteria and that are suitable for use with the invention include thulium, holmium and erbium among others.

The aforedescribed presently preferred embodiment of the invention requires processing of the fluorescence signal to extract the temperature related characteristics of the reflected pulses. Several signal processing techniques employing analog and/or digital methods are presently available. These signal processing techniques can be grouped into two general categories including a simultaneous processing technique of both the flame flicker and temperature inputs and a non-simultaneous processing technique which periodically disables the flicker sensing for a short interval to collect temperature characteristics. An example of the simultaneous detection technique using digital signal processing methods will now be described, from which it will become readily apparent that a generalization will permit non-simultaneous processing.

An underlying principle of simultaneous flicker and temperature processing is frequency multiplexing. The term "flicker" is used here to include both flame and non-flame signals that are being processed to determine whether a fire is present. Flame flicker frequencies are primarily between 1 and 10 Hz while a fluorescent response pulse whose decay time is to be measured contains most of its useful information above 50 Hz. The low noise amplifiers 40a and 40b can readily pass the frequencies required. The excitation pulse is preferably generated by the same sensor electronics which analyze the flicker signals. The pulse is preferably generated at a pulse rate of at least twice the highest flicker frequency of interest. The excitation pulse is generated in phase coherence with the flicker sampling. The resulting aliasing effect produces extraneous inputs to the flame processor including a constant (DC) offset and also harmonic frequencies of the excitation pulse. These harmonic frequencies however are generally far greater than the 1 to 10 Hz flicker spectrum and are rejected by filters 44. The DC terms are generally ignored by flicker processing components 46a, 46b and 48 while the pulse components may be readily filtered out for processing by oversampling and averaging with no resulting degradation of fire sensing performance. For example, a flicker signal sampled at 100 times per second may have superimposed on it a synchronized pulse train at the same rate without creating alias components between 1 and 10 Hz.

In order to extract decay time constant information from the extracted response pulse, the pulse is sampled in phase coherence with a train of excitation pulses. This sampling technique permits the averaging of the data from many individual pulses in order to remove the random effects of flame flicker or other light variations from the scene viewed by the lens. For example, a pulse rate of 100 per second permits the averaging of several hundred time constant measurements over an interval of a few seconds during which random fluctuations due to flame flicker are averaged out. In that the flame flicker signal content is relatively weak at the frequencies of the fluorescent response pulses and because many response pulse samples are typically averaged, for example 128 or 256, the time constant data can be extracted to an accuracy which is adequate for temperature measurement.

The greater the amount of signal averaging the greater is the accuracy of the temperature measurement. By example, for an average of 256 samples an accuracy of approximately $\pm 20°$ C. over a 400° C. span can be attained.

The trailing edge of the return pulse is preferably sampled at least three times at appropriately spaced positions along the trailing edge, the samples being taken immediately following the termination of the excitation pulse. In this regard it can be shown that if the shape of the trailing edge decay is known to be exponential in nature, three data points are sufficient to estimate the time constant with an accuracy suitable for temperature measurement in fire sensor applications. The assumption of a purely exponential shape is not essential to the success of the invention as any predictable curve which varies in a known manner with temperature can be employed. The curve parameters may be used for input to a mathematical operation or a look-up table (LUT) 24 from which the temperature is obtained. Corrections for amplifier distortion may also be included at this point, eliminating the need for tight constraints upon performance. For the case of sinusoidal excitation (FIG. 2b) the same timing relationships apply, with the response (now approximately sinusoidal in shape) providing data for phase shift relative to the excitation. This phase shift is processed by a mathematical operation or the LUT 24.

From the above it may be seen that care must be taken to insure separation between flicker and temperature processing. If flicker and temperature measurement are not to be performed simultaneously, some of these constraints disappear. Pulse data must still be averaged because flame flicker or other light signals may be present, but response time constants and excitation frequency are no longer restricted to remain well above the flicker region of 1 to 10 Hz in order to avoid crosstalk. Also, flicker signal filtering to remove pulse components is not required if pulses are not present during fire sensing.

When installed in a given volume, such as an aircraft engine nacelle, the doped fiber is preferably installed entirely within the volume to be measured for temperature. As the volume heats up, the time constant of the doped fiber decreases. However, if a hot spot develops, the shorter time constant from this area will be partially masked by the longer time constant from cooler areas.

This may be overcome by employing several different types of doped fibers either pumped by the same laser diode or by multiple laser diodes. If each section of doped fiber has a different fluorescence wavelength, the temperature at different locations is detected by the same electronics. In this case, a fourth detector and electronics (not shown) similar to the circuit of 18c would be necessary.

Whether a single type of doped fiber or multiple types are used, an undoped fiber will be necessary to couple fiber 12 to coupler 26 if coupler 26 is not located in proximity to the volume that is being measured. This is to avoid the fluorescence of cooler doped fibers outside the area being measured and masking the effect of shorter time constants in the high temperature areas.

Also, it should be noted that the embodiments disclosed thus far can employ silica or germania based fiber but that the use of other types of fiber, having different radiation transmission properties, is within the scope of the invention. For example, fluoride glass fiber that transmits in the visible to approximately 5 micron range and chalcogenide glass that transmits within the 2 to 10 micron range may be employed. As such the choice of detector 18, source 28 and fluorescent doping material is a function of the particular pass band of the fiber, among other considerations.

A further embodiment of the invention dopes the optical fiber with a material selected for its absorption characteristics as opposed to its fluorescent characteristics. By example, the source radiation is launched into the fiber 12 and the radiation reflected from the end of the fiber via the dichroic coupler 12a or backscattered along the length of the fiber is measured and analyzed to determine, as a function of absorption, the temperature of the fiber. As an example, and referring again to FIG. 4, it can be seen that the radiation absorption characteristics of Nd-doped glass fiber is strongly temperature dependant at certain wavelengths. Of course, the doping material must be selected such that it does not strongly absorb within the flame wavelength bands of interest. A solution is to provide a source 28 that emits outside of the bands of interest for fire sensing and a separate detector and signal processing electronics to process the reflected or backscattered radiation. To accomplish this with electronic bandwidths of less than 1 KHz implies that one must sense the returning signal during the transmit interval. A method for accomplishing this is disclosed in U.S. Pat. No. 4,623,788, assigned to the assignee of this applicant, and requires the amplitude of the return signal from the dichroic 12a to be greater than the reflections from interface elements such as the couplers 26a and 12a. Typical reflection from coupler 12a is 4% and typical coupling from source 28 to detector 18 through coupler 26a is less than 3%. If the reflectance at the transmit wavelength is at least 80%, then the normal return signal at 20° C. is more than a factor of ten above returns from 12a and 26a. In addition, it will be advantageous to compensate the source 28 for temperature changes. This is commonly done using a silicon detector in the same package as the source 28, where the silicon detector receives a small but fixed portion percentage of the light emitted by source 28. As temperature changes and the light emitted by 28 decreases, the silicon detector signal is also reduced and the feedback circuit increases the drive to the source 28 to maintain constant light output over temperature. Commercially available laser diodes usually include this feature.

Alternatively, one could use a transmit—receive technique used by optical time domain reflectometers (OTDR's) where a short transmit pulse is sent out and a return signal is measured a short time after the trailing edge of the transmit pulse. A difficulty with this OTDR method is related to the relatively short fiber lengths (approximately 30 meters maximum for an aircraft application) of fire and overheat detection systems, as compared to communication-type optical fiber systems that are typically measured in kilometers. The shorter fiber lengths imply that the reflected pulse is received within several nanoseconds after transmission, thereby placing significant demands on the pulsewidth of the source and the bandwidth of the detector electronics. As a result, this particular approach may add cost and complexity to the system 10.

While the invention has been particularly shown and described with respect to preferred embodiments thereof, it will be understood by those skilled in the art that changes in form and details may be made therein without departing from the scope and spirit of the invention. As such, the invention is intended to be limited only as the invention is defined by the claims that follow.

What is claimed is:

1. A fire detection system having a fiber optic conductor for conveying radiation from a distal end to a proximal end thereof, said system comprising:

first means, optically coupled to said proximal end of said fiber optic conductor, for detecting within a first and within a second spectral band the radiation conveyed from said distal end of said fiber optic conductor;

second means, distributed throughout a length of said fiber optic conductor, for emitting radiation within a third spectral band, said emitted radiation having at least one characteristic which is a function of a temperature of said second means; and third means, optically coupled to said second means through said fiber optic conductor, for generating radiation for inducing said second means to emit the radiation within said third spectral band.

2. A system as set forth in claim 1 wherein said first spectral band is approximately 0.8 microns to approximately 1.1 microns, wherein said second spectral band is approximately 1.3 microns to approximately 1.5 microns, and wherein said third spectral band is approximately 1.8 microns to approximately 2.1 microns.

3. A system as set forth in claim 1 wherein said third means comprises a source of radiation having a periodic output and wherein said second means comprises a fluorescent material.

4. A system as set forth in claim 3 wherein said fluorescent material is selected from the group consisting of thulium, holmium, erbium or combinations thereof.

5. A system as set forth in claim 3 wherein said fluorescent material emits a pulse of fluorescent radiation in response to a pulse of radiation from said third means, wherein said at least one characteristic includes a decay time of a trailing edge of the pulse of fluorescent radiation, wherein said detecting means comprises means for sampling the trailing edge a plurality of times for determining the decay time thereof and wherein said detecting means further comprises means for correlating the determined decay time with the temperature of said body.

6. A fire detection system having a fiber optic conductor for conveying radiation at least from a distal end to a proximal end thereof, said system comprising:

detecting means, optically coupled to said proximal end of said fiber optic conductor, for detecting within a first spectral band of approximately 0.8 microns to approximately 1.1 microns and within a second spectral band of approximately 1.3 microns to approximately 1.5 microns radiation conveyed from said distal end of said fiber optic conductor;

emitting means, distributed along at least a portion of the length of said fiber optic conductor, for emitting fluorescent radiation having a wavelength or wavelengths within a third spectral band, said emitted fluorescent radiation having at least one characteristic which is a function of a temperature of said emitting means, said detecting means further detecting the radiation within said third spectral band; and source means, optically coupled to said emitting means through said fiber optic conductor, for generating radiation having wavelengths for inducing said emitting means to emit the radiation within said third spectral band.

7. A system as set forth in claim 6 wherein said emitting means is selected from the group consisting of thulium, holmium, erbium or combinations thereof.

8. A system as set forth in claim 6 wherein said detecting means comprises:

first radiation detecting means responsive to radiation within said first spectral band and having an output signal coupled to a first signal channel;

second radiation detecting means responsive to radiation within said second spectral band and having an output signal coupled to a second signal channel;

third radiation detecting means responsive to radiation within said third spectral band and having an output signal coupled to a third signal channel;

wherein each of said first and said second signal channels comprise in combination means responsive to signals having frequencies associated with flame flicker frequencies including amplifier means, variable gain means, bandpass filter means and randomness testing means;

wherein said detecting means further includes cross correlation means having an input from each of the first and the second signal channels and also ratio detecting means having an input from each of said bandpass filter means; and wherein said detecting means further comprises output means having inputs coupled to said first and said second signal channels, said ratio detector means and said cross correlation means and an output responsive thereto for indicating the occurrence of a flame.

9. A system as set forth in claim 6 wherein said emitting means emits a pulse of fluorescent radiation in response to a pulse of radiation from said source means, wherein said at least one characteristic includes a decay time of a trailing edge of the pulse of fluorescent radiation, and wherein said detecting means comprises means for sampling the trailing edge a plurality of times for determining the decay time thereof and wherein said detecting means further comprises means for correlating the determined decay time with the temperature of said portion of the length of said optical fiber conductor.

10. A system as set forth in claim 9 wherein said correlating means includes a look-up table means.

11. A system as set forth in claim 6 wherein said emitting means emits fluorescent radiation in a sinusoidal manner in response to sinusoidally modulated radiation emitted from said source means, wherein said at least one characteristic includes a phase shift between the emission of the emitting means and the emission of said source means, and wherein said detecting means comprises means for determining the amount of the phase shift and further comprises means for correlating the determined phase shift with the temperature of said portion of the length of said optical fiber conductor.

12. A system as set forth in claim 11 wherein said correlating means includes a look-up table means.

13. In a fire detection system having a fiber optic conductor for conveying radiation having wavelengths within a first and a second spectral band from a distal end to a proximal end thereof, the radiation originating from within a region of interest, a method of sensing an overheat condition along a length of said fiber optic conductor, comprising the steps of:

periodically modulating a source of optical radiation;

conveying the modulated radiation through the fiber optic conductor to fluorescent material distributed along at least a portion of the length of the fiber optic conductor;

inducing the fluorescent material to emit fluorescent radiation in a periodic manner, the fluorescent radiation having wavelengths within a third spectral band, a characteristic of the periodically emitted fluorescent radiation having a magnitude which is a function of a temperature the body of fluorescent material;

sampling the fluorescent radiation to determine the magnitude of the characteristic; and correlating the determined magnitude with the temperature of the fluorescent material and with the portion of the length of the fiber optic conductor.

14. A method is set forth in claim 13 wherein the first spectral band is approximately 0.8 microns to approximately 1.1 microns, wherein the second spectral band is approximately 1.3 microns to approximately 1.5 microns and wherein the step of inducing the fluorescent material to emit fluorescent radiation in a periodic manner, the fluorescent radiation having wavelengths within a third spectral band is a step of inducing the fluorescent material to emit fluorescent radiation in a periodic manner in the spectral band between approximately 1.8 microns to approximately 2.1 microns.

15. A method as set forth in claim 13 wherein the step of correlating is accomplished with a table look-up means.

16. A method as set forth in claim 13 wherein the step of periodically modulating is accomplished by periodically modulating a source having an output wavelength within the first spectral band and wherein the step of sampling includes a step of comparing a signal power of a reflected portion of the periodically modulated source to a reference signal power to compensate for a variation, if any, in a signal power of the periodically modulated source.

17. In a fire detection system having a fiber optic conductor for conveying radiation having wavelengths within a first and a second spectral band from a distal end to a proximal end thereof, the radiation originating from within a region of interest, a method of sensing an overheat condition along a length of said fiber optic conductor, comprising the steps of:

periodically modulating a source of optical radiation;

conveying the modulated radiation through the fiber optic conductor and through a material distributed along at least a portion of the length of the fiber optic conductor, the material having a temperature dependant radiation absorbing characteristic for absorbing a portion of the modulated radiation;

reflecting a portion of the modulated radiation back through the fiber optic conductor;

sampling the reflected radiation to determine the magnitude of the absorbed portion of the modulated radiation; and correlating the determined magnitude with the temperature of the material and with the portion of the length of the fiber optic conductor.

* * * * *